United States Patent [19]

Giancola et al.

[11] Patent Number: 4,645,994
[45] Date of Patent: Feb. 24, 1987

[54] SPACE-REFERENCED, RATE-STABILIZED MULTIPLE-GIMBAL-PLATFORM SYSTEM

[75] Inventors: Vincent Giancola, Brea; Edward M. Borseth, Claremont, both of Calif.

[73] Assignee: General Dynamics, Pomona Division, Pomona, Calif.

[21] Appl. No.: 728,622

[22] Filed: Apr. 29, 1985

[51] Int. Cl.⁴ .............................................. B64C 17/06
[52] U.S. Cl. .................................... 318/649; 318/648; 318/689
[58] Field of Search ........................ 318/648, 649, 689

[56] References Cited

U.S. PATENT DOCUMENTS

| | | | |
|---|---|---|---|
| 2,462,925 | 3/1949 | Varian | 318/625 |
| 2,526,665 | 10/1950 | Hull et al. | 318/560 |
| 2,536,495 | 1/1951 | Ewing | 318/560 |
| 2,638,288 | 5/1953 | Hanna | 318/649 |
| 2,700,106 | 1/1955 | Taylor | 318/625 |
| 2,733,391 | 1/1956 | Mayer | 318/625 |
| 2,751,535 | 6/1956 | Kuhnel | 318/625 |
| 2,783,421 | 2/1957 | Hering | 318/625 |
| 3,166,703 | 1/1965 | Mintzer | 318/560 |
| 3,382,422 | 5/1968 | Meier | 318/590 |
| 3,443,476 | 5/1969 | Heider et al. | 318/649 |
| 3,534,327 | 10/1970 | Lukso | 318/648 |
| 3,988,659 | 10/1976 | Ambrosini | 318/648 |
| 4,016,469 | 4/1977 | Lanni et al. | 318/590 |
| 4,396,878 | 8/1983 | Cole et al. | 318/648 |

*Primary Examiner*—William M. Shoop, Jr.
*Assistant Examiner*—Saul M. Bergmann

*Attorney, Agent, or Firm*—Edward W. Callan; Edward B. Johnson

[57] ABSTRACT

A space-referenced, rate-stabilized gimbal platform system for use in a vehicle. The system includes a master gimbal mounted to the vehicle frame and having a master platform that is pivotable with respect to a first axis that is perpendicular to the longitudinal axis of the vehicle and pivotable with respect to a second axis that is perpendicular to the first axis; a two-axis rate gyroscope mounted to the master platform; and a slave gimbal having a slave platform for supporting directional apparatus, such as an antenna or sensor. The slave platform is pivotable with respect to a third axis that is parallel to the first axis and pivotable with respect to a fourth axis that is perpendicular to the third axis. The system further includes a pair of angular rate servo loop systems for rate stabilizing the master platform with respect to the first and second axes and a pair of angular position servo loop systems for stabilizing the slave platform with respect to the third and fourth axes in accordance with the position of the master platform with respect to the first and second axes respectively, to thereby cause the orientation of the directional apparatus to track the orientation of the gyroscope. The servo loop systems decouple the platforms from the motion of the frame of the vehicle at lower frequencies and the gimbals are directly driven to improve decoupling at high frequencies above the bandwidth of the servo loops.

14 Claims, 5 Drawing Figures

SPACE-REFERENCED, RATE-STABILIZED MULTIPLE-GIMBAL-PLATFORM SYSTEM

BACKGROUND OF THE INVENTION

The present invention generally pertains to gimbal systems and is particularly directed to an improvement in rate stabilizing, space-referenced gimbal platforms that support directional apparatus such as an antenna or a sensor.

In the prior art, the directional apparatus is mounted to a gimbal having a gyroscope mounted thereto so that the directional apparatus maintains the same orientation as the gyroscope. Gimbal systems are contained in vehicles, such as aircraft, missiles and ships, for use in navigation and/or guidance systems.

In prior art space-referenced, rate-stabilized gimbal systems, the gimbal platform is controlled by an angular rate servo loop system in response to a commanded rate signal that indicates a commanded rate of angular motion of the platform about a given axis. The rate of angular motion of the platform about the given axis is sensed by the gyroscope which provides a sensed rate signal indicating the sensed rate. The sensed rate signal is differentially compared with the commanded rate signal to provide an error signal indicating the difference between the compared rate signals. A rotary actuator, such as a torque motor, responds to the error signal by repositioning the platform with respect to the given axis until the error signal is less than a predetermined value. A two-axis gimbal platform could be controlled by two such rate servo loop systems.

Prior art gimbal platform systems also are controlled by angular position servo loop systems in response to a commanded position signal that indicates a commanded angular position of the platform with respect to a given axis. The angular position of the platform with respect to the given axis is sensed by a position transducer, such as a potentiometer coupled to the gimbal, to provide a sensed position signal indicating the sensed position. The sensed position signal is differentially compared with the commanded position signal to provide an error signal indicating the difference between the compared position signals. A rotary actuator responds to the error signal by repositioning the platform with respect to the given axis until the error signal is less than a given value. A two-axis gimbal platform could be controlled by two such position servo loop systems.

Gimbal platform systems contained in missiles support antennas and/or sensors for tracking targets in space. The gimbal system also must decouple the motion of the missile airframe from the motion of the platform-mounted antenna and/or sensor.

Tracking a target requires only a low frequency response by the antenna or sensor. However, decoupling the gimbal platform from airframe motion requires a high frequency response to airframe movements incident to transient missile maneuvers and airframe angular vibrations. Adequate decoupling at these higher frequencies is particularly important when an optical type of sensor is mounted on the platform since high frequency vibrations of the sensor can cause distortion or blurring of the sensed image.

SUMMARY OF THE INVENTION

The present invention provides a space-referenced, rate-stabilized gimbal platform system utilizing multiple gimbal platforms to better decouple the directional apparatus from the airframe. The system includes a master gimbal having a master platform that is pivotable with respect to a first axis; a gyroscope mounted to the master platform and a slave gimbal having a slave platform for supporting directional apparatus, wherein the slave platform is pivotable with respect to a second axis that is parallel to the first axis. The system of the present invention includes an angular rate servo loop system for rate stabilizing the master platform and an angular position servo loop system for position stabilizing the slave platform in accordance with the position of the master platform to cause the orientation of the directional apparatus to track the orientation of the gyroscope with respect to the first and second axes.

In the rate servo loop system, the gyroscope senses the angular rate of motion of the master platform with respect to the first axis and provides a sensed rate signal to indicate the sensed rate with respect to the first axis. A differential comparator differentially compares the sensed rate signal with a commanded rate signal and provides a first error signal to indicate the difference between the compared rate signals. A rotary actuator responds to the first error signal by repositioning the master platform with respect to the first axis until the first error signal is less than a predetermined value.

In the position servo loop system, a first position transducer senses the angular position of the master platform with respect to the first axis and provides a first position signal to indicate the angular position of the master platform with respect to the first axis. A second position transducer senses the angular position of the slave platform with respect to the second axis and provides a second position signal to indicate the angular position of the slave platform with respect to the second axis. A second differential comparator differentially compares the first and second position signals and provides a second error signal to indicate the difference between the compared first and second position signals. A second rotary actuator responds to the second error signal by repositioning the slave platform with respect to the second axis until the second error signal is less than a given value to thereby track the orientation of the slave platform to the orientation of the master platform with respect to the respective first and second axes. As a result, the orientation of the directional apparatus tracks the orientation of the gyroscope with respect to the first and second axes.

The system of the present invention is particularly useful in a vehicle, such as a missile. For such applications, the master gimbal is mounted to the airframe of the missile; the master platform is pivotable with respect to a first axis that is perpendicular to the longitudinal axis of the missile and is also pivotable with respect to a second axis that is perpendicular to the first axis; the slave gimbal also is mounted to the airframe of the missile; and the slave platform is pivotable with respect to a third axis that is parallel to the first axis and is also pivotable with respect to a fourth axis that is perpendicular to the third axis. Two rate servo loop systems are used for rate stabilizing the master platform with respect to the first and second axes and two position servo loop systems are used for position stabilizing the slave platform with respect to the third and fourth axes. A two-axis rate gyroscope is utilized for sensing the rate of angular motion of the master platform with respect to both the first and second axes.

As a consequence of mounting the gyroscope on a separate (master) platform, the entire slave platform can be utilized for mounting an antenna or sensor and its associated electronic hardware. Look angle capability of the slave platform is improved, particularly when there are tight packaging constraints.

Reduction of the mass on the slave platform by mounting the gyroscope on a separate platform enables the directional apparatus on the slave platform to track more quickly since there is less inertia to be overcome.

Preferably the rotary actuators are located on their respective axes to directly drive the pivoting of the platforms about their respective axes. The term "directly drive" means that the drive is accomplished without the use of linkages or gears which are included in many typical gimbal systems. As a result, the inertia of such indirect drive mechanisms do not have to be accelerated and the high frequency decoupling response of the system at the higher frequencies above the bandwidth of the servo loops is improved.

Additional features of the present invention are described in relation to the description of the preferred embodiment.

DESCRIPTION OF THE PREFERRED EMBODIMENT

Figure 1:
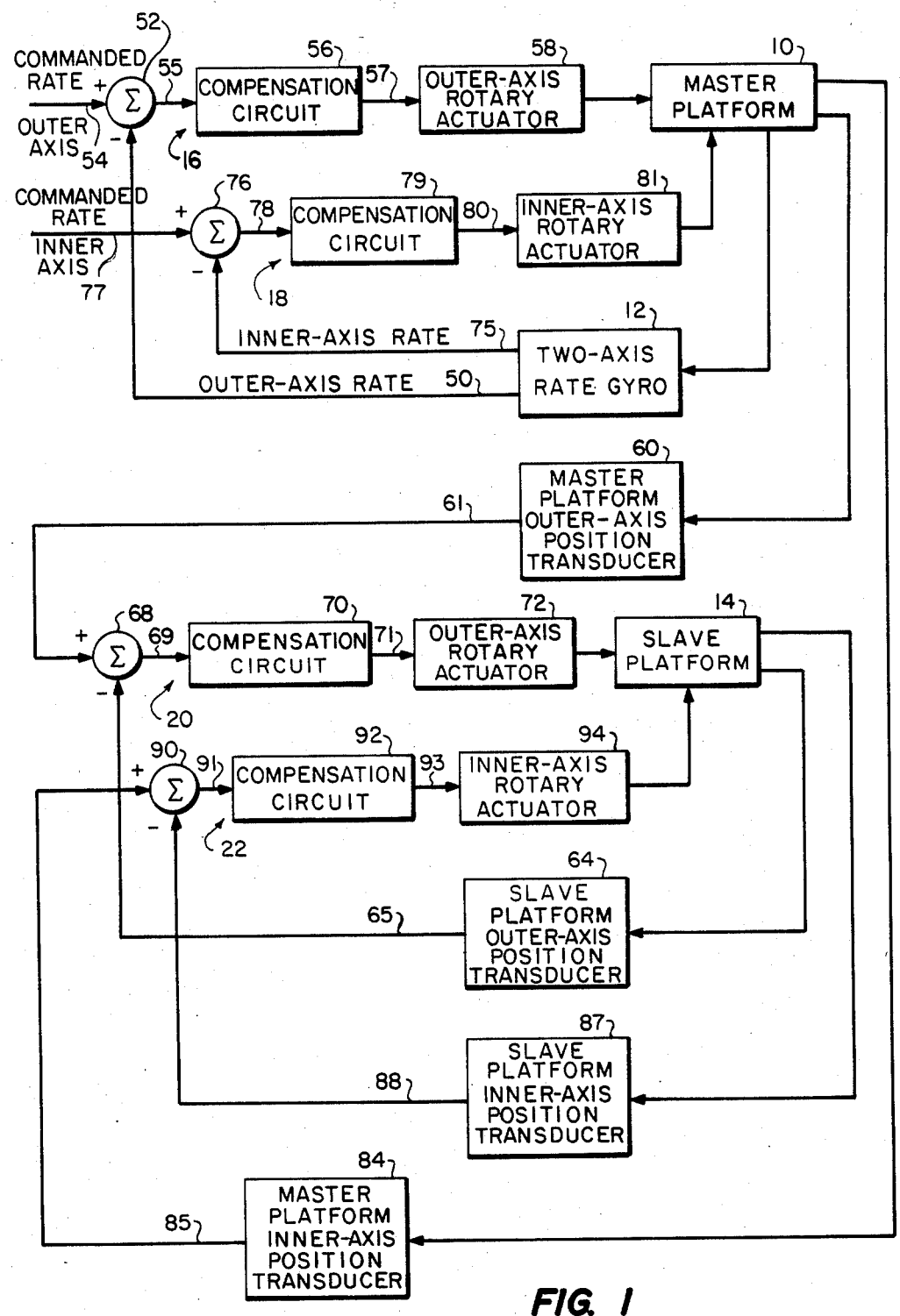
FIG. 1 is a block diagram of the system of the present invention.

Referring to FIG. 1, the preferred embodiment of the system of the present invention includes a master gimbal platform 10, a two-axis rate gyroscope 12 mounted to the master platform 10, a slave platform 14, an outer-axis rate servo loop system 16, an inner-axis rate servo loop system 18, an outer-axis position servo loop system 20 and an inner-axis position servo loop system 22.

Figure 2:
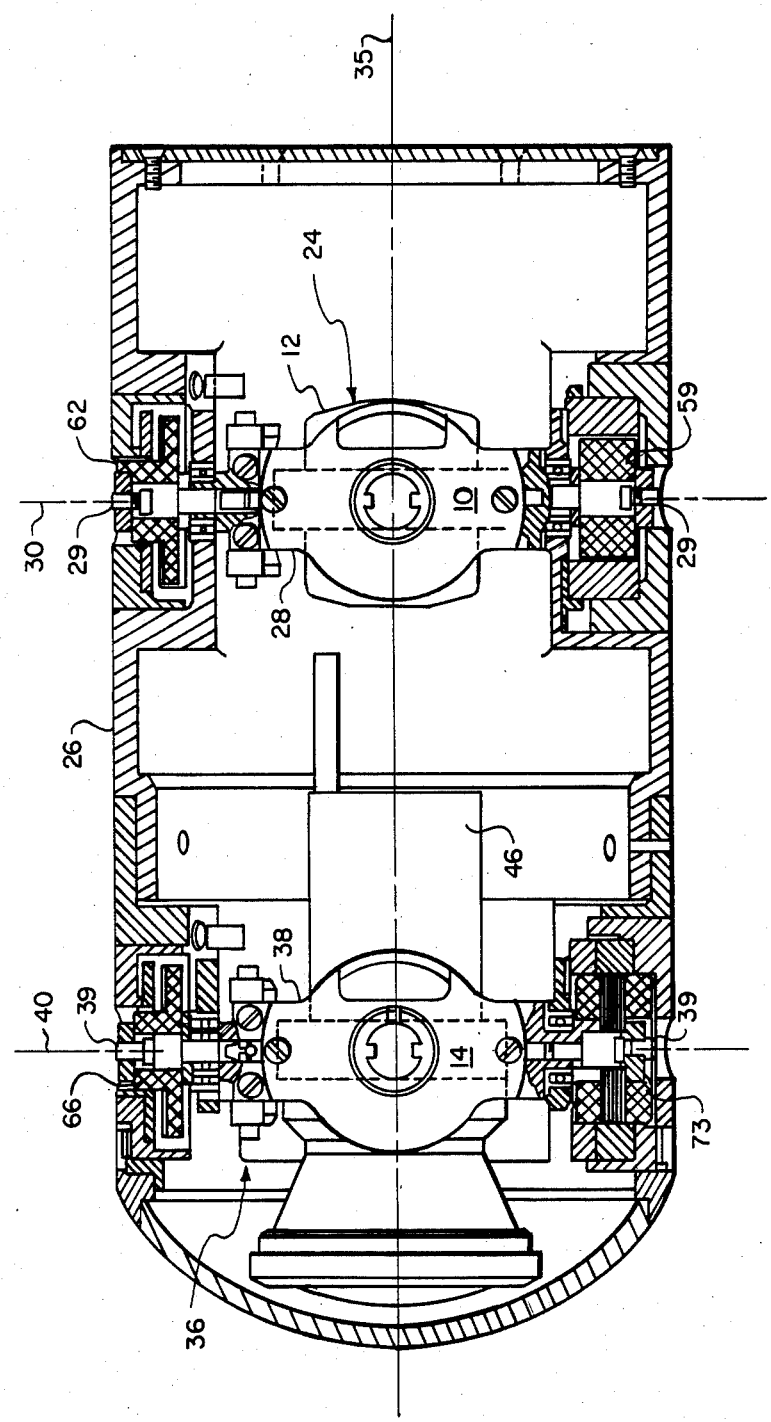
FIG. 2 is a partial cross-sectional view of the gimbal system mounted in an airframe taken along the plane of the outer axes of the respective gimbals.
Figure 3:
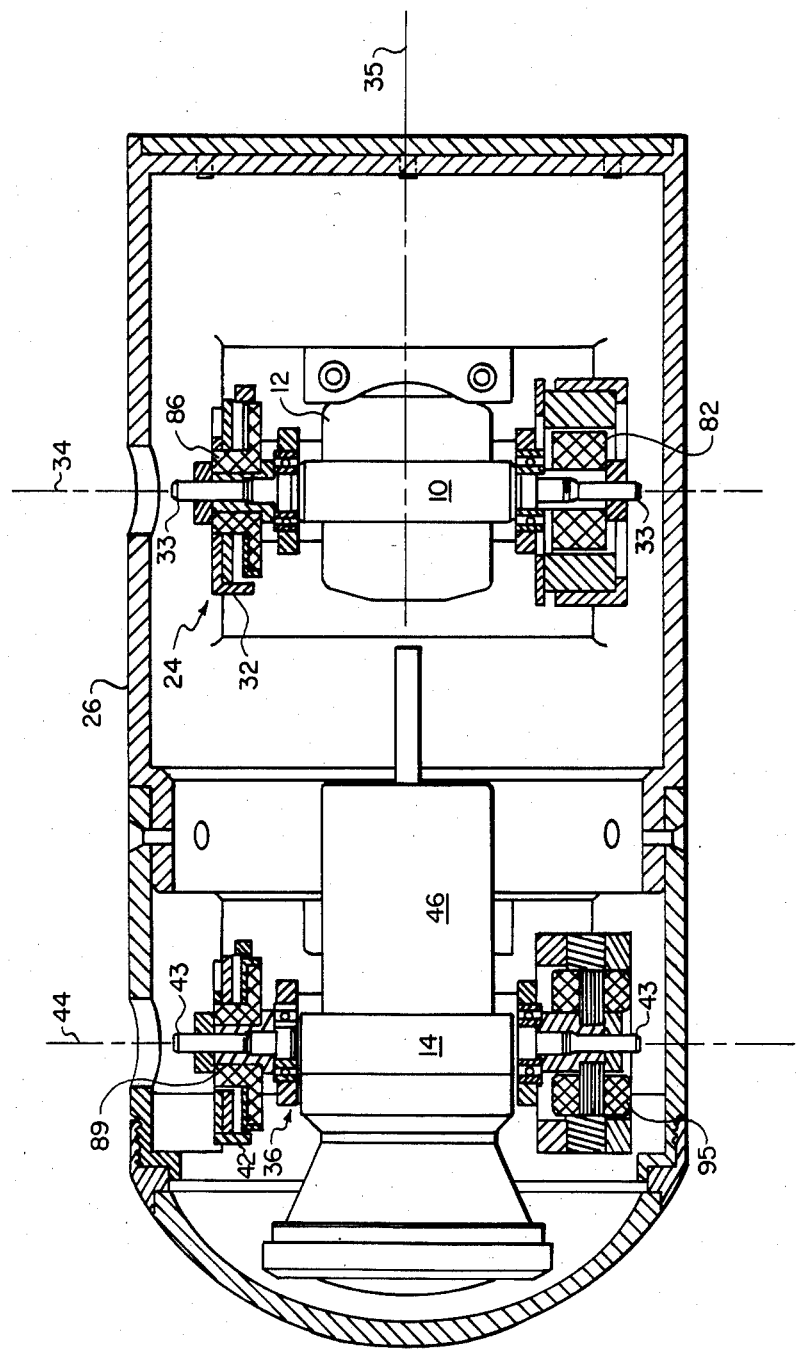
FIG. 3 is a partial cross-sectional view of the gimbal system mounted in an airframe taken along the plane of the inner axes of the respective gimbals.
Figure 4:
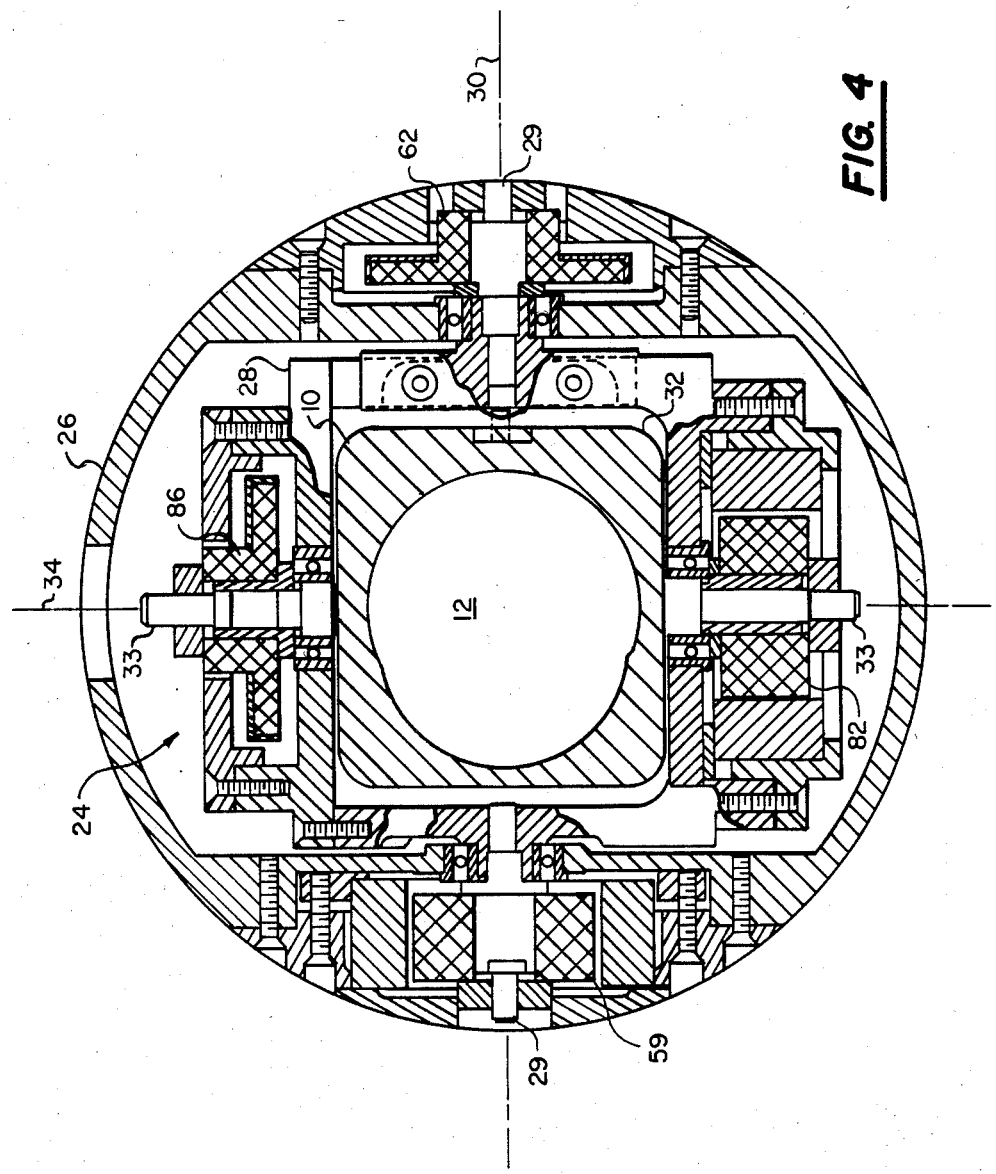
FIG. 4 is a partial cross-sectional view of the master gimbal platform mounted in an airframe taken along the outer axes of the master gimbal and normal to the longitudinal axis of the airframe.

Referring to FIGS. 2, 3 and 4, the master platform 10 is included in a master gimbal 24, which is mounted to the airframe 26 of a missile. The master gimbal 24 includes an outer ring 28 and an inner ring 32. The outer ring 28 is peripherally mounted to axles 29 that are journaled to the airframe 26 so that the outer ring 28 is coplanar with the outer axis 30 of the master gimbal 24 and pivotable with respect to the outer axis 30. The inner ring 32 is peripherally mounted to axles 33 that are journaled to the outer ring 28 so that the inner ring 32 is coplanar with the inner axis 34 of the master gimbal 24 and pivotable with respect to the inner axis 34. The inner ring 32 supports the master platform 10. The two-axis rate gyroscope 12 is mounted on the master platform 10. The outer axis 30 is perpendicular to the longitudinal axis 35 of the airframe 26 and the inner axis 34 is perpendicular to the outer axis 30.

Referring to FIGS. 2 and 3, the slave gimbal platform 14 is included in a slave gimbal 36 which is mounted to the airframe 26. The slave gimbal 36 includes an outer ring 38 and an inner ring 42. The outer ring 38 is peripherally mounted to axles 39 that are journaled to the airframe 26 so that the outer ring 38 is coplanar with the outer axis 40 of the slave gimbal 36 and pivotable with respect to the outer axis 40. The inner ring 42 is peripherally mounted to axles 43 that are journaled to the outer ring 38 so that the inner ring 42 is coplanar with the inner axis 44 of the slave gimbal 36 and pivotable with respect to the inner axis 44. The inner ring 42 supports the slave platform 14. A directional antenna 46 is mounted on the slave platform 14. The outer axis 40 is perpendicular to the longitudinal axis 35 of the airframe 26 and the inner axis 44 is perpendicular to the outer axis 40.

Referring again to FIG. 1, the operation of the outer rate servo loop system 16 is described. The gyroscope 12 senses the angular rate of motion of the master platform 10 with respect to the outer axis 30 of the master gimbal 24 and provides a sensed outer-axis rate signal 50 to indicate the sensed rate with respect to the outer axis 30. A differential comparator 52 differentially compares the sensed outer-axis rate signal 50 with a commanded outer-axis rate signal 54 and provides a first error signal 55 to indicate the difference between the compared outer-axis rate signals 50, 54. A compensation circuit 56 processes the first error signal 55 to provide a first drive signal 57. A rotary actuator 58 responds to the first drive signal 57 by repositioning the master platform 10 with respect to the outer axis 30 until the first error signal 55 is less than a predetermined value. The rotary actuator 58 is a torque motor 59 (FIGS. 2 and 4) located on the outer axis 30 of the master gimbal 24 for directly driving the axle 29 to pivot the master platform 10 with respect to the outer axis 30.

In the outer axis position servo loop system 20, a master platform outer axis position transducer 60 senses the angular position of the master platform 10 with respect to the outer axis 30 of the master gimbal 24 and provides a first position signal 61 to indicate the angular position of the master platform 10 with respect to the outer axis 30. The master platform outer axis position transducer 60 includes a potentiometer 62 (FIGS. 2 and 4) coupled to the axle 29 of outer ring 28 for sensing the angular position of the master platform 10 with respect to the outer axis 30.

A slave platform outer-axis position transducer 64 senses the angular position of the slave platform 14 with respect to the outer axis 40 of the slave gimbal 36 and provides a second position signal 65 to indicate the angular position of the slave platform 14 with respect to the outer axis 40. The slave platform outer-axis position transducer 64 includes a potentiometer 66 (FIG. 2) coupled to the axle 39 of the outer ring 38 for sensing the angular position of the slave platform 14 with respect to the outer axis 40.

A differential comparator 68 differentially compares the first and second position signals 61, 65 and provides a second error signal 69 to indicate the difference between the compared first and second position signals 61, 65. A compensation circuit 70 processes the second error signal 69 to provide a second drive signal 71. A rotary actuator 72 responds to the second drive signal 71 by repositioning the slave platform 14 with respect to the outer axis 40 until the second error signal 69 is less than a given value to thereby track the orientation of the slave platform 14 to the orientation of the master platform 10 with respect to the respective outer axes 30, 40. The rotary actuator 72 is a torque motor 73 (FIG. 2) located on the outer axis 40 of the slave gimbal 36 for directly driving the axle 39 to pivot the slave platform 14 with respect to the outer axis 40.

In the inner-axis rate servo loop system 18, the gyroscope 12 senses the angular rate of motion of the master platform 10 with respect to the inner axis 34 of the master gimbal 24 and provides a sensed inner-axis rate signal 75 to indicate the sensed rate with respect to the inner axis 34. A differential comparator 76 differentially compares the sensed inner-axis rate signal 75 with a commanded inner-axis rate signal 77 and provides a third error signal 78 to indicate the difference between the compared inner-axis rate signals 75, 77. A compensation circuit 79 processes the third error signal 78 to provide a third drive signal 80. A rotary actuator 81 responds to the third drive signal 80 by repositioning the master platform 10 with respect to the inner axis 34 until the third error signal is less than the predetermined value. The rotary actuator 81 is a torque motor 82 (FIGS. 3 and 4) located on the inner axis 34 of the master gimbal 24 for directly driving the axle 33 to pivot the master platform 10 with respect to the inner axis 33.

In the inner axis position servo loop system 22, a master platform inner-axis position transducer 84 senses the angular position of the master platform 10 with respect to the inner axis 34 of the master gimbal 24 and provides a third position signal 85 to indicate the angular position of the master platform 10 with respect to the inner axis 34. The master platform inner-axis position transducer 84 includes a potentiometer 86 (FIGS. 3 and 4) coupled to the axle 33 of the inner ring 32 for sensing the angular position of the master platform 10 with respect to the inner axis 34.

A slave platform inner-axis position transducer 87 senses the angular position of the slave platform 14 with respect to the inner axis 44 of the slave gimbal 36 and provides a fourth position signal 88 to indicate the angular position of the slave platform with respect to the inner axis 44.

The slave platform inner-axis position transducer 87 includes a potentiometer 89 (FIG. 3) coupled to the axle 43 of the inner ring 42 for sensing the angular position of the slave platform 14 with respect to the inner axis 44.

A differential comparator 90 differentially compares the third and fourth position signals 85, 88 and provides a fourth error signal 91 to indicate the difference between the compared third and fourth position signals 85, 88. A compensation circuit 92 processes the fourth error signal 91 to provide a fourth drive signal 93. A rotary actuator 94 responds to the fourth drive signal 93 by repositioning the slave platform 14 with respect to the inner axis 44 until the fourth error signal 91 is less than the given value to thereby track the orientation of the slave platform 14 to the orientation of the master platform 10 with respect to the respective inner axes 34, 44. The rotary actuator 94 is a torque motor 95 (FIG. 3) located on the inner axis 44 of the slave gimbal 36 for directly driving the axle 43 to pivot the slave platform 14 with respect to the inner axis 44.

The combined action of all four servo loop systems 16, 18, 20, 22 causes the orientation of the directional antenna 46 to track the orientation of the gyroscope 12.

Figure 5:
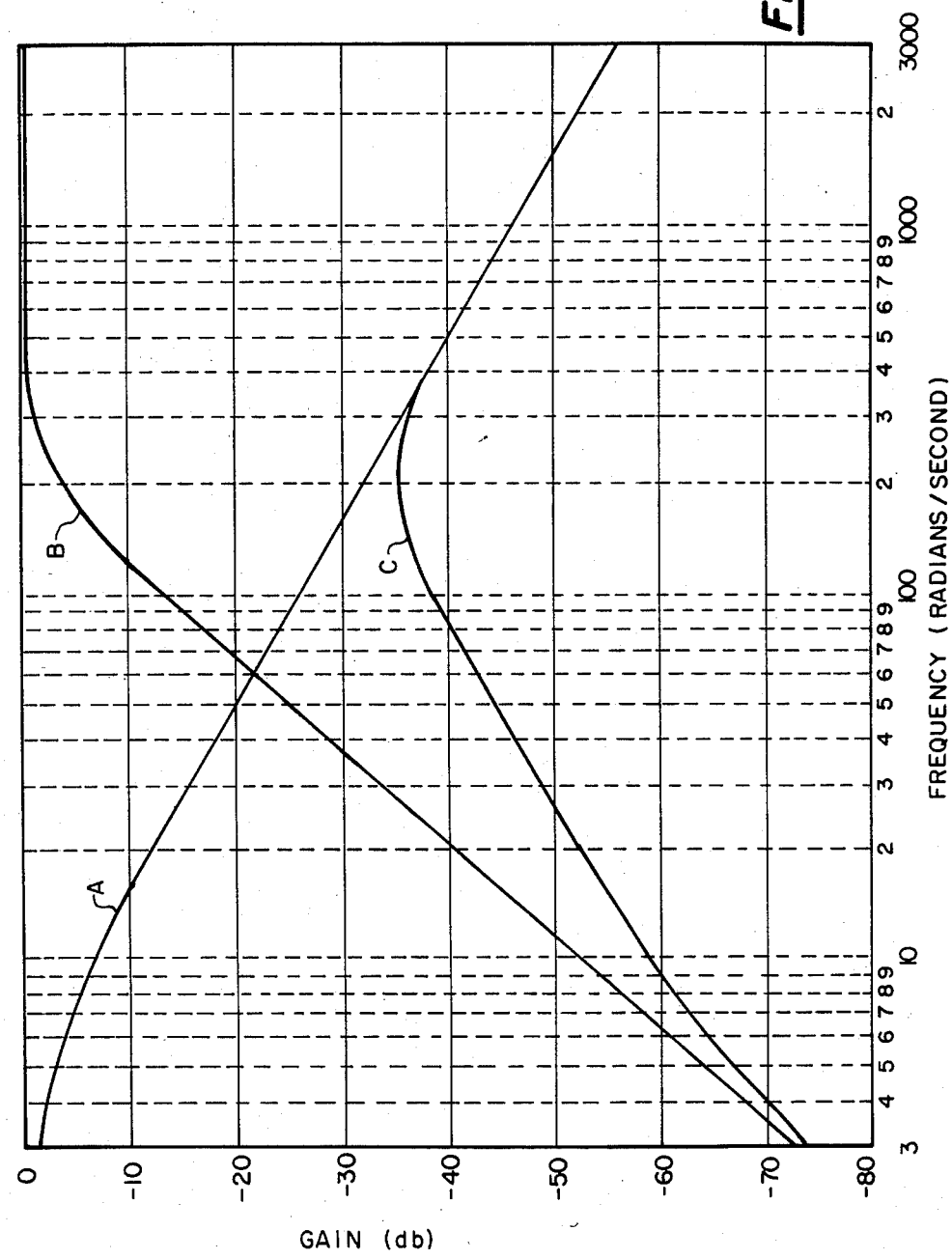
FIG. 5 illustrates the decoupling characteristics of the system of the present invention.

The decoupling response of the system of the present invention is discussed with reference to FIG. 5. Curve A shows the decoupling response of the gimbals without the servo loops. It is seen that decoupling improves at higher frequencies. This is largely due to the mechanical design of the gimbal system wherein the gimbals are directly driven by the torque motors. The response curve A illustrating the decoupling response without the servo loops was determined by calculating the ratio of the coupling forces (viscous friction and stiction) to the inertia.

Curve B shows the decoupling response provided by the servo loops. This response is a function of the gain and bandwidth of the angular rate servo loop systems 16 and 18 and the angular position servo loop systems 20 and 22. It is seen that decoupling decreases at higher frequencies.

Curve C shows the decoupling response of the gimbal system of the present invention. Curve C illustrates the combination of response curves A and B and shows how the servo loops provide low frequency decoupling and how the mechanical design of the gimbal system provides high frequency decoupling. The corner frequency in Curve C where decoupling starts to increase (gain starts to decrease) is proportional to the ratio of D to J, where D is the damping term and J is the inertia of the gimbal platforms. Thus, for a given inertia, if the damping (friction) can be reduced, the corner frequency is lowered and greater damping results at the higher frequencies.

The master platform 10 and slave platform 14 can be arranged one behind the other (as shown in FIGS. 2 and 3) or beside each other, and may be any distance apart as long as the respective gimbal axes of each platform are maintained parallel to one another. This aspect provides wide versatility in packaging.

Also, more than one slave platform can be coupled to the master platform for stabilization.

In accordance with an alternative aspect of the present invention, where space permits, mechanical coupling may be utilized in lieu of the angular position servo loop system for stabilizing the slave platform with respect to the master platform, thereby reducing costs by eliminating the requirement for the electrical components of the angular position servo loop system.

We claim:

1. A space-referenced, rate-stabilized gimbal platform system, comprising
   a master gimbal having a master platform that is pivotable with respect to a first axis;
   a gyroscope mounted to the master platform;
   a slave gimbal having a slave platform for supporting directional apparatus, wherein the slave platform is pivotable with respect to a second axis that is parallel to the first axis;
   an angular rate servo loop system for rate stabilizing the master platform with respect to the first axis; and
   an angular position servo loop system for stabilizing the slave platform with respect to the second axis in accordance with the position of the master platform with respect to the first axis to thereby cause the orientation of said directional apparatus to track the orientation of the gyroscope with respect to the first and second axes.

2. A system according to claim 1, wherein the angular rate servo loop system comprises
   the gyroscope for sensing the angular rate of motion of the master platform with respect to said first axis and for providing a sensed rate signal to indicate the sensed rate with respect to said first axis;

means for differentially comparing the sensed rate signal with a commanded rate signal and for providing a first error signal to indicate the difference between the compared rate signals; and means responsive to the first error signal for repositioning the master platform with respect to said first axis until the first error signal is less than a predetermined value; and wherein the angular position servo loop system comprises means for sensing the angular position of the master platform with respect to said first axis and for providing a first position signal to indicate said angular position of the master platform with respect to said first axis;

means for sensing the angular position of the slave platform with respect to said second axis and for providing a second position signal to indicate said angular position of the slave platform with respect to said second axis;

means for differentially comparing the first and second position signals and for providing a second error signal to indicate the difference between the compared first and second position signals; and means responsive to the second error signal for repositioning the slave platform with respect to said second axis until the second error signal is less than a given value to thereby track the orientation of the slave platform to the orientation of the master platform with respect to said respective first and second axes, whereby the orientation of said directional apparatus tracks the orientation of the gyroscope with respect to the first and second axes.

3. A system according to claim 2, wherein each of the repositioning means is located on its respective axis to directly drive the pivoting of the respective platform about such axis.

4. A system according to claim 2, wherein the master platform is also pivotable with respect to a third axis that is perpendicular to the first axis;

wherein the slave platform is also pivotable with respect to a fourth axis that is perpendicular to the second axis; and wherein the system further comprises a second angular rate servo loop system for rate stabilizing the master platform with respect to the third axis; and a second angular position servo loop system for stabilizing the slave platform with respect to the fourth axis in accordance with the position of the master platform with respect to the third axis to thereby cause the orientation of said directional apparatus to track the orientation of the gyroscope with respect to the third and fourth axes.

5. A system according to claim 4, wherein the second angular rate servo loop system further comprises the gyroscope for sensing the angular rate of motion of the master platform with respect to said third axis and for providing a second sensed rate signal to indicate the sensed rate with respect to said third axis;

means for differentially comparing the second sensed rate signal with a second commanded rate signal and for providing a third error signal to indicate the difference between the compared second rate signals; and means responsive to the third error signal for repositioning the master platform with respect to said third axis until the third error signal is less than said predetermined value; and wherein the second angular position servo loop system further comprises means for sensing the angular position of the master platform with respect to said third axis and for providing a third position signal to indicate said angular position of the master platform with respect to said third axis;

means for sensing the angular position of the slave platform with respect to said fourth axis and for providing a fourth position signal to indicate said angular position of the slave platform with respect to said fourth axis;

means for differentially comparing the third and fourth position signals and for providing a fourth error signal to indicate the difference between the compared third and fourth position signals; and means responsive to the fourth error signal for repositioning the slave platform with respect to said fourth axis until the fourth error signal is less than said given value to thereby track the orientation of the slave platform to the orientation of the master platform with respect to the respective third and fourth axes;

whereby the orientation of the directional apparatus tracks the orientation of the gyroscope with respect to the third and fourth axes.

6. A system according to claim 5, wherein each of the repositioning means is located on its respective axis to directly drive the pivoting of the respective platform about such axis.

7. A space-referenced, rate-stabilized gimbal platform system for use in a vehicle having a frame and a longitudinal axis, the system comprising a master gimbal mounted to the vehicle frame and having a master platform that is pivotable with respect to a first axis that is perpendicular to said longitudinal axis;

a gyroscope mounted to the master platform;

a slave gimbal having a slave platform for supporting directional apparatus, wherein the slave platform is pivotable with respect to a second axis that is parallel to the first axis;

an angular rate servo loop system for rate stabilizing the master platform with respect to the first axis; and an angular position servo loop system for stabilizing the slave platform with respect to the second axis in accordance with the position of the master platform with respect to the first axis to thereby cause the orientation of said directional apparatus to track the orientation of the gyroscope with respect to the first and second axes.

8. A system according to claim 7, wherein the angular rate servo loop system comprises the gyroscope for sensing the angular rate of motion of the master platform with respect to said first axis and for providing a sensed rate signal to indicate the sensed rate with respect to said first axis;

means for differentially comparing the sensed rate signal with a commanded rate signal and for providing a first error signal to indicate the difference between the compared rate signals;

means responsive to the first error signal for repositioning the master platform with respect to said first axis until the first error signal is less than a predetermined value; and wherein the angular position servo loop system comprises means for sensing the angular position of the master platform with respect to said first axis and for providing a first position signal to indicate said angular position of the master platform with respect to said first axis;

means for sensing the angular position of the slave platform with respect to said second axis and for providing a second position signal to indicate said angular position of the slave platform with respect to said second axis;

means for differentially comparing the first and second position signals and for providing a second error signal to indicate the difference between the compared first and second position signals;

means responsive to the second error signal for repositioning the slave platform with respect to said second axis until the second error signal is less than a given value to thereby track the orientation of the slave platform to the orientation of the master platform with respect to the first and second axes;

whereby the orientation of said directional apparatus tracks the orientation of the gyroscope with respect to the first and second axes.

9. A system according to claim 8, wherein each of the repositioning means is located on its respective axis to directly drive the pivoting of the respective platform about such axis.

10. A space-referenced, rate-stabilized gimbal platform system for use in a vehicle having a frame and a longitudinal axis, the system comprising a master gimbal mounted to the vehicle frame and having a master platform that is pivotable with respect to a first axis that is perpendicular to said longitudinal axis and pivotable with respect to a second axis that is perpendicular to the first axis;

a gyroscope mounted to the master platform;

a slave gimbal having a slave platform for supporting directional apparatus, wherein the slave platform is pivotable with respect to a third axis that is parallel to the first axis and pivotable with respect to a fourth axis that is perpendicular to the third axis;

a first angular rate servo loop system for rate stabilizing the master platform with respect to the first axis;

a first angular position servo loop system for stabilizing the slave platform with respect to the third axis in accordance with the position of the master platform with respect to the first axis to thereby cause the orientation of said directional apparatus to track the orientation of the gyroscope with respect to the first and third axes;

a second angular rate servo loop system for rate stabilizing the master platform with respect to the second axis; and a second angular position servo loop system for stabilizing the slave platform with respect to the fourth axis in accordance with the position of the master platform with respect to the second axis to thereby cause the orientation of said directional apparatus to track the orientation of the gyroscope with respect to the second and fourth axes.

11. A system according to claim 10, wherein the first angular rate servo loop system comprises the gyroscope for sensing the angular rate of motion of the master platform with respect to said first axis and for providing a first sensed rate signal to indicate the sensed rate with respect to said first axis;

means for differentially comparing the first sensed rate signal with a first commanded rate signal and for providing a first error signal to indicate the difference between the compared first rate signals; and means responsive to the first error signal for repositioning the master platform with respect to said first axis until the first error signal is less than a predetermined value;

wherein the first angular position rate servo loop system comprises means for sensing the angular position of the master platform with respect to said first axis and for providing a first position signal to indicate said angular position of the master platform with respect to said first axis;

means for sensing the angular position of the slave platform with respect to said third axis and for providing a second position signal to indicate said angular position of the slave platform with respect to said third axis;

means for differentially comparing the first and second position signals and for providing a second error signal to indicate the difference between the compared first and second position signals; and means responsive to the second error signal for repositioning the slave platform with respect to said third axis until the second error signal is less than a given value to thereby track the orientation of the slave platform to the orientation of the master platform with respect to the first and third axes;

wherein the second angular rate servo loop system comprises the gyroscope for sensing the angular rate of motion of the master platform with respect to a said second axis and for providing a second sensed rate signal to indicate the sensed rate with respect to said second axis;

means for differentially comparing the second sensed rate signal with a second commanded rate signal and for providing a third error signal to indicate the difference between the compared second rate signals; and means responsive to the third error signal for repositioning the master platform with respect to said second axis until the third error signal is less than said predetermined value; and wherein the second angular position rate servo loop system comprises means for sensing the angular position of the master platform with respect to said second axis and for providing a third position signal to indicate said angular position of the master platform with respect to said second axis;

means for sensing the angular position of the slave platform with respect to said fourth axis and for providing a fourth position signal to indicate said angular position of the slave platform with respect to said fourth axis;

means for differentially comparing the third and fourth position signals and for providing a fourth error signal to indicate the difference between the compared third and fourth position signals; and means responsive to the fourth error signal for repositioning the slave platform with respect to said fourth axis until the fourth error signal is less than said given value to thereby track the orientation of the slave platform to the orientation of the master platform with respect to the second and fourth axes;

whereby the orientation of said directional apparatus tracks the orientation of the gyroscope.

12. A system according to claim 11, wherein the master gimbal includes a first ring coplanar with the first axis and journaled to the frame of the vehicle for pivotal motion with respect to the first axis, and a second ring supporting the master platform, coplanar with the second axis and journaled to the first ring for pivotal motion with respect to the second axis;

wherein the slave gimbal includes a third ring coplanar with the third axis and journaled to the frame of the vehicle for pivotal motion with respect to the third axis and a fourth ring supporting the slave platform, coplanar with the fourth axis and journaled to the third ring for pivotal motion with respect to the fourth axis; and wherein each of the repositioning means is located on its respective axis to directly drive the pivoting of the respective gimbal ring or platform about such axis.

13. A system according to claim 11, wherein each of the repositioning means is located on its respective axis to directly drive the pivoting of the respective platform about such axis.

14. A space referenced, rate-stabilized gimbal platform system, comprising a master gimbal having a master platform that is pivotable with respect to a first axis;

a gyroscope mounted to the master platform;

a slave gimbal having a slave platform for supporting directional apparatus, wherein the slave platform is pivotable with respect to a second axis that is parallel to the first axis;

an angular rate servo loop system for rate stabilizing the master platform with respect to the first axis; and means for stabilizing the slave platform with respect to the second axis in accordance with the position of the master platform with respect to the first axis to thereby cause the orientation of said directional apparatus to track the orientation of the gyroscope with respect to the first and second axes.

* * * * *